Nov. 14, 1967    P. C. MASTERS    3,351,968
HOSE GUIDE APPARATUS
Filed Oct. 23, 1965    3 Sheets-Sheet 1

INVENTOR.
PHILIP C. MASTERS
BY Hamilton & Cook
ATTORNEYS

Nov. 14, 1967 P. C. MASTERS 3,351,968
HOSE GUIDE APPARATUS
Filed Oct. 23, 1965 3 Sheets-Sheet 2

INVENTOR.
PHILIP C. MASTERS
BY Hamilton & Cook
ATTORNEYS

Nov. 14, 1967 P. C. MASTERS 3,351,968
HOSE GUIDE APPARATUS
Filed Oct. 23, 1965 3 Sheets-Sheet 3

INVENTOR.
PHILIP C. MASTERS
BY *Hamilton & Cook*
ATTORNEYS

United States Patent Office 3,351,968
Patented Nov. 14, 1967

3,351,968
HOSE GUIDE APPARATUS
Philip C. Masters, Ashland, Ohio, assignor to The F. E. Myers & Bro. Co., Ashland, Ohio, a corporation of Ohio
Filed Oct. 23, 1965, Ser. No. 502,982
1 Claim. (Cl. 15—104.3)

The present invention relates generally to hose guide apparatus. More particularly, the invention relates to hose guide tackle for directing a cleaning device into a waste disposal conduit. Specifically, the invention relates to a tackle arrangement of pulley assemblies for supporting and directing a nozzle supply hose into a waste disposal conduit.

Although sewers and other waste disposal conduits have been greatly improved in recent years in terms of imperviousness to penetration by exterior objects and more effective screening methods, periodic blockages remain a problem. The relatively slight grade in these conduits and the resulting low velocity of the fluid therein is insufficient to keep such materials as sand, gravel, and sludge from accumulating or building up in localized areas. Therefore, it remains necessary to intermittently employ mechanical means in the form of scoops, scrapers, nozzles dispensing pressurized fluids, or other similar mechanical devices which can be inserted in the conduits to free the deposits and flush them away.

Of the many devices which have been proposed and employed for the cleaning of waste conduits hitherto, substantially all such apparatus has required manual operation and adjustment in the manholes at the level of the various conduits. Due to the noxious and in some cases even toxic, nature of this environment, a number of remote control devices operable from the street level, or other displaced locations, have been introduced into use. One of the most effective and inexpensive devices of this nature is the self-propelled nozzle which is attached to a length of hose supplying an input of high pressure fluid, as described in United States Letters Patent No. 3,080,265.

A primary problem in the employment of self-propelled nozzle devices is the high incidence of damage to the trailing fluid supply hose necessitating frequent replacement. Since most waste disposal conduits are located a short distance underground and are accessible only from spaced manholes, the hose must be payed downwardly into a manhole and subsequently laterally into the appropriate horizontal conduit. The hose damage results primarily from friction induced wear when the hose contacts the surface rim of a manhole shaft or the opening into a waste conduit. Since it is advantageous to employ high fluid pressures in a nozzle to optimize propulsion and cleaning, the hose is often payed out quite rapidly. Further wear is occasioned by the forced retrieval of the hose while fluid is being supplied to flush out the conduit. Thus, the combined effect of these operational practices reduces the life expectancy of hose to a prohibitively short duration.

Accordingly, a principal object of the present invention is to provide hose guide tackle for a waste disposal conduit cleaning apparatus which will protect a nozzle hose from extreme frictional or abrasive wear during pay out and retrieval.

Another object of the invention is to provide hose guide tackle for waste disposal conduit cleaning apparatus which will smoothly change the direction orientation of a nozzle hose in a predetermined manner.

An additional object of the invention is to provide hose guide tackle for waste disposal conduit cleaning apparatus which allows a nozzle hose storage unit to be operated from a remote location.

A further object of the invention is to provide a hose guide pulley which can be adjustably positioned in relation to a waste disposal conduit so that a nozzle hose is redirected to enter the conduit without frictionally or abrasively contacting it.

Still another object of the invention is to provide a hose guide pulley which can be adjustably positioned in a manhole opening to redirect a nozzle hose into the opening without contacting its periphery.

Other objects are to provide hose guide tackle which is relatively inexpensive, durable, and easy to position and operate.

Various other objects and advantages will appear from the following description taken in conjunction with the attached drawings, and the novel features will be particularly pointed out hereinafter in conjunction with the appended claims.

A hose guide apparatus according to the invention is adapted for use with underground conduit cleaning equipment having a trailing hose. The hose guide tackle has an upper pulley assembly positioned in a manhole shaft with a sheave which engages the trailing hose and directs it into the manhole shaft without abrasively contacting its rim. A lower pulley assembly is positioned at the juncture of the manhole shaft and a conduit and has a sheave engaging the trailing hose and redirecting it nonabrasively into the conduit.

Figure 1:
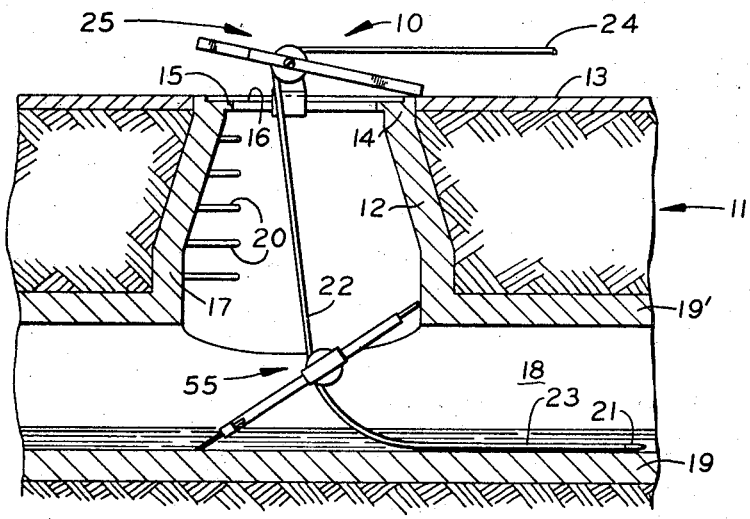
FIG. 1 is a vertical cross sectional view of a sewer or waste disposal network illustrating hose guide tackle according to the present invention positioning a cleaning device hose.

Referring now to the drawings and particularly to FIG. 1, hose guide tackle according to the present invention is indicated generally by the numeral 10. For purposes of illustration and description, the hose guide tackle 10 is shown in operating position in an exemplary underground waste disposal network or sewer, generally indicated by the numeral 11. The hose guide tackle 10, or portions thereof as necessary, may be employed in other similar conduits such as drainage tiles, culverts, or telephone and electric lines.

A typical waste disposal network 11 has a hollow manhole shaft 12 extending downwardly into the ground from a street or surface level 13. When not undergoing a cleaning operation, the manhole shaft 12 is normally sealed at its surface rim 14 by a manhole cover (not shown) which seats in a circular groove 15. Radially inwardly and below the groove 15, the manhole shaft 12 has a small projecting lug 16, which is used for purposes of the present invention in a manner to be hereinafter described. The manhole shaft 12 expands at its lower end 17 and communicates with a waste carrying conduit or channel 18 having a lower wall 19 and an upper wall 19'. For convenience in employing manual maintenance techniques, manhole shafts 12 are frequently equipped with a plurality of spaced footholds or ladder rungs 20 to facilitate ingress and egress by maintenance personnel.

The underground waste conduit 18 may extend great distances underground, join with additional similar conduits, and be serviced by additional intermittently spaced accesses, similar to manhole shaft 12. In order to clean the extended lengths of conduit 18 between access points, a fluid propelled cleaning nozzle 21 is lowered in the manhole shaft 12 and inserted in the conduit 18. The nozzle 21 is preferably of a self-propelled design as described in United States Letters Patent No. 3,080,265 to which reference is made for such structural and operational details as are required to more fully understand the invention.

A supply of cleansing fluid is provided to the nozzle 21 by a trailing high pressure hose 2 attached thereto at one end 23. The hose 22 has a second end 24 which remains at street level and is preferably attached to a mobile cleaning assembly or truck (not shown). These assemblies are normally equipped with a pump, a suitable power plant, and a water supply to which the end 24 of hose 22 is attached. A powered hose reel may be employed to stow the hose 22 when not in use and to retrieve the hose 22 and nozzle 21, as described in my copending United States patent application, Ser. No. 469,556, filed July 6, 1965. For most high pressure sewer and culvert cleaning operations, the hose 22 is preferably of flexible multiple ply reinforced construction with a cover that is fluid and abrasion resistant and with an inside diameter on the order of one inch.

Figure 2:
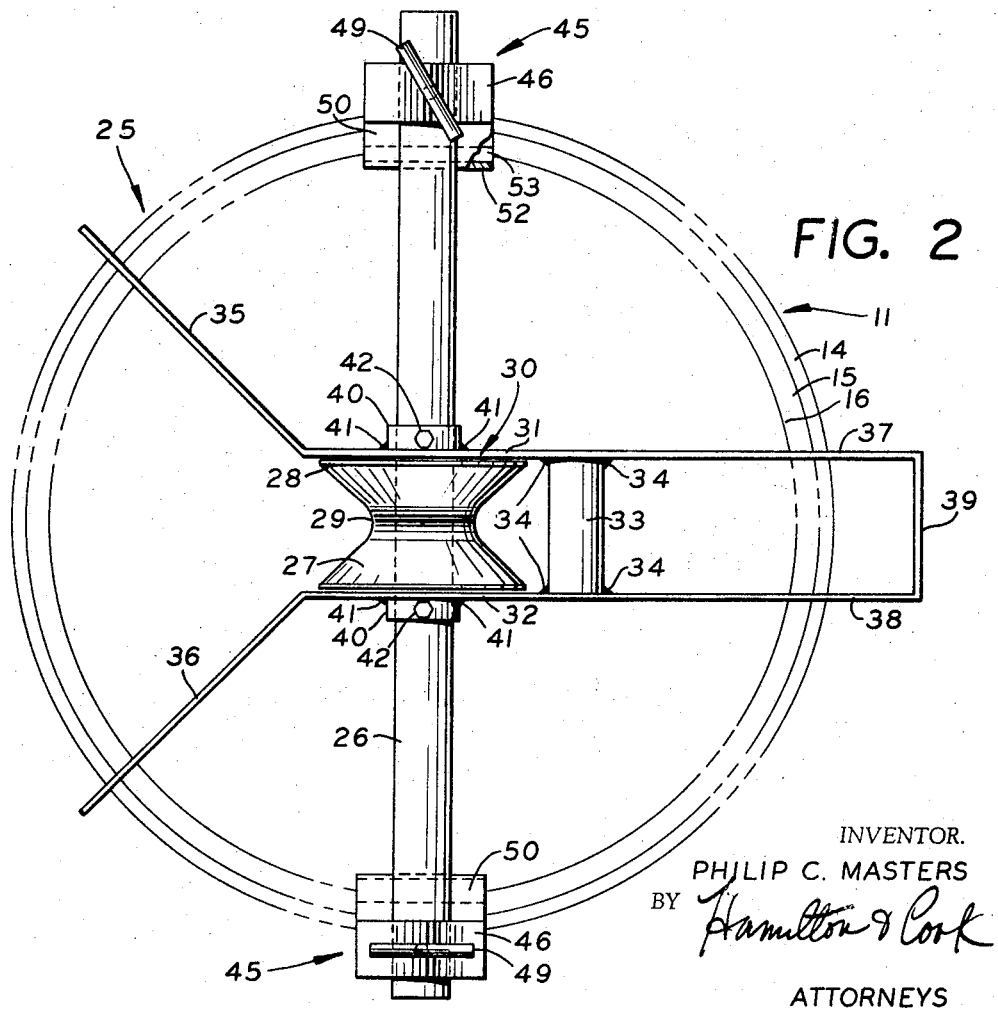
FIG. 2 is an enlarged top plan view of the upper pulley assembly of the hose guide tackle of FIG. 1, superimposed on a manhole opening, with a portion broken away to show the attachment to the manhole opening.
Figure 3:
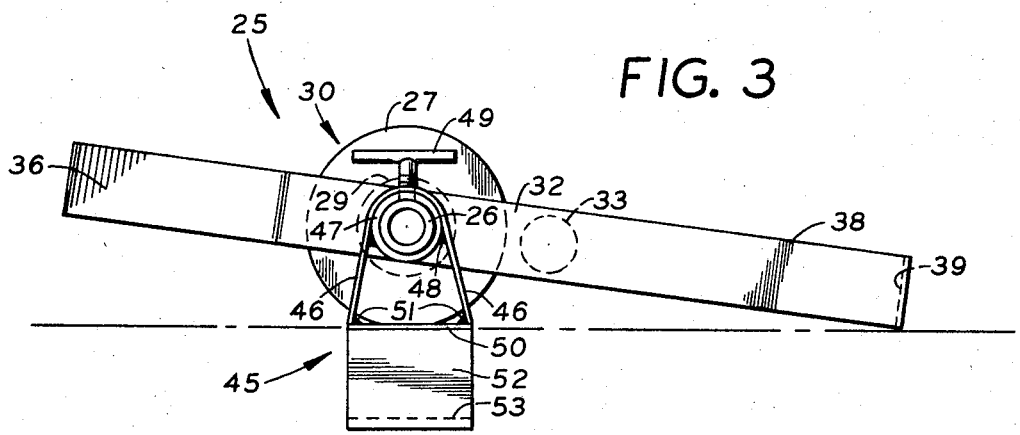
FIG. 3 is a side elevation of the upper pulley assembly of the hose guide tackle shown in FIG. 2 in its operating orientation.

Referring now to FIGS. 2 and 3, the hose guide tackle 10 has an upper pulley assembly, generally indicated by the numeral 25, which guides and supports the hose 22 in the area of the surface rim 14 of manhole shaft 12. Extending preferably substantially diametrically across or spanning manhole shaft 12 and above surface rim 14 is an axle or shaft 26 which may be hollow for lightweight and mounts a freely rotatable sheave 27 of conventional design. The sheave 27 has a somewhat cylindrical rim portion 28 which may be provided with a medial indentation or groove 29 adapted to engage and seat the hose 22.

The sheave 27 is enclosed and positioned on shaft 26 by a Y-shaped pulley block, generally indicated by the numeral 30. The pulley block 30 has identical parallel frame members 31 and 32 which straddle and snugly enclose the sheave 27. In order to avoid any possible pinching or jamming of sheave 27 when the block 30 is placed under stress, a spacer dowel 33 is rigidly attached between frame members 31, 32, as by fillet welds 34, proximately of the sheave 27. The frame members 31, 32 diverge outwardly of sheave 27 into angular guide bars 35 and 36, defining a V-shaped trough which urges or directs an enclosed hose 22 into contact with the sheave 27. Frame members 31, 32 also have extensions 37, 38 projecting beyond spacer dowel 33 a distance greater than a radius of manhole surface opening 14 and resting on the street 13 to constitute a torque member resisting any tendency of the pulley block 30 to rotate about the shaft 26. For greater overall rigidity of pulley block 30, the extensions 37, 38 are preferably joined by an end bar 39.

Pulley block 30 and its enclosed sheave 27 are normally positioned substantially medially of shaft 26 and centrally of manhole shaft 12; however, an adjustable mounting is preferred to avoid obstructions in manhole shaft 12. To achieve this axial adjustment of sheave 27 on shaft 26, the frame members 31, 32 of block 30 are fitted with hubs 40 rigidly attached, as by fillet welds 41. The hubs 40 are restricted from axial movement on shaft 26 by set screws 42, or other approximate attachment means.

The shaft 26 is restrained vertically and axially over manhole shaft 12 by a pair of clamps or collars, generally indicated by the numeral 45. Shaft 26 is supported in U-shaped housings 46 of collars 45 by cylindrical bushings 47 which are rigidly attached to the housings 46, as by single bevel groove welds 48. The collars 45 are selectively axially affixed along the shaft 26 by T-headed set screws 49 extending through the housings 46 and bushings 47 to contact the shaft 26 when appropriately hand rotated. The housings 46 are rigidly attached to seating plates 50 which are adapted to engage surface rim 14 of manhole shaft 12. As shown, the housings 46 and seating plates 50 are joined by single-V groove welds 51 along the legs of U-shaped housings 46. The seating plates 50 have vertical extension arms 52 at their inner extremity which terminate in radial gripping arms 53 that extend under the projecting lugs 16 of manhole shaft 12. Thus, once both collars 45 are positioned at the surface rim 14 of manhole 12, the shaft 26 is precluded from vertical motion in either direction.

Figure 5:
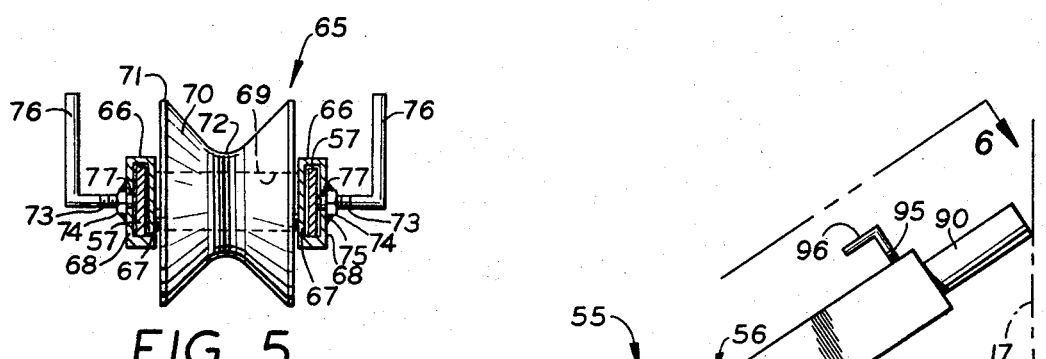
FIG. 5 is a cross sectional view of the pulley block and sheave portion of the lower pulley assembly, taken substantially on line 5—5 of FIG. 4.
Figure 4:
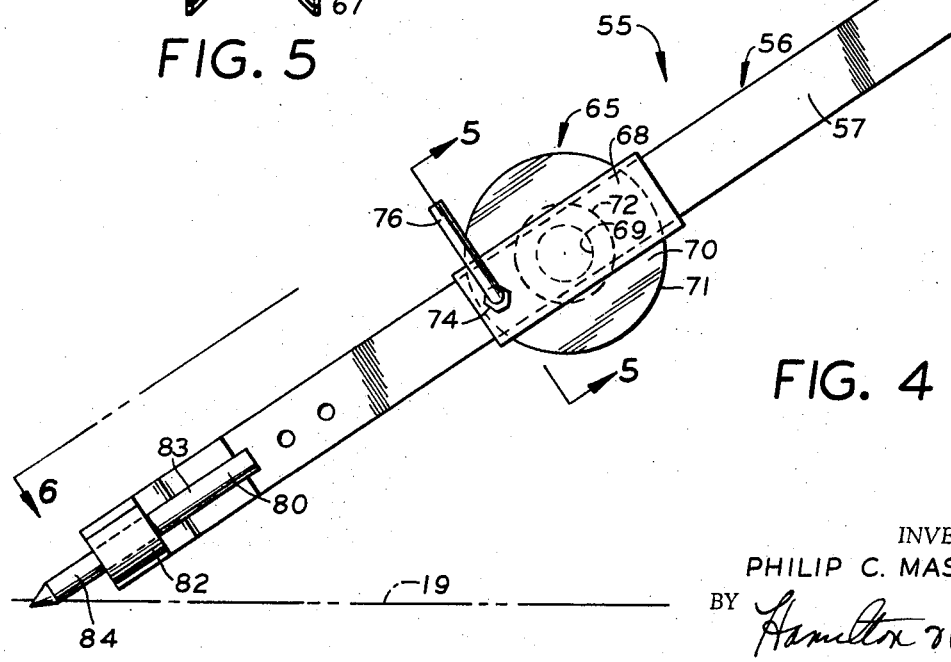
FIG. 4 is an enlarged side elevation of the lower pulley assembly of the hose guide tackle of FIG. 1 in an exemplary operating orientation.
Figure 6:
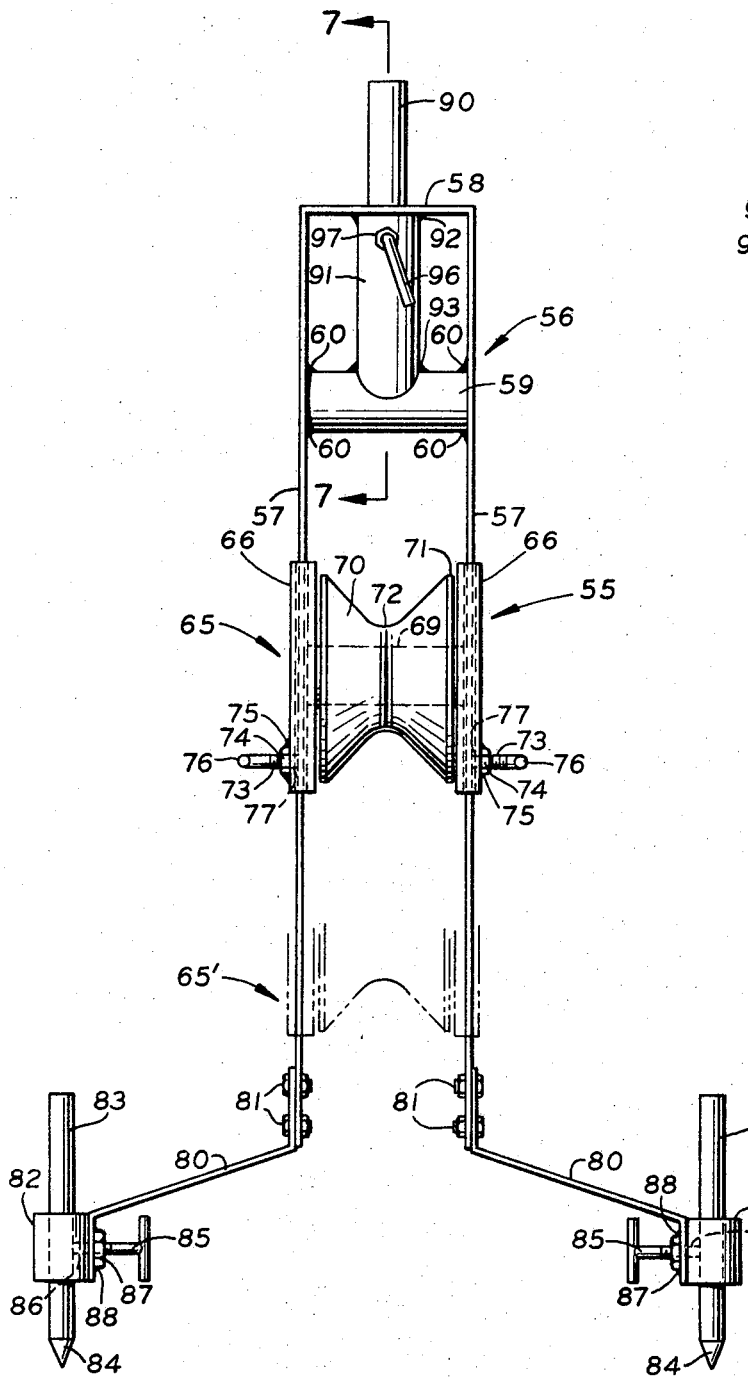
FIG. 6 is a top view of the entire lower pulley assembly of the hose guide tackle, taken substantially on line 6—6 of FIG. 4.
Figure 7:
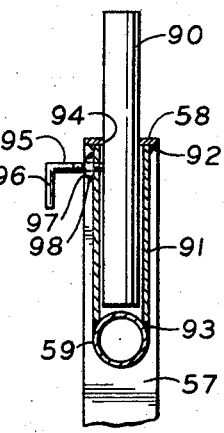
FIG. 7 is a cross sectional view of the top positioning adjustment of the lower pulley assembly, taken substantially on line 7—7 of FIG. 6.

After directing the hose 22 to a vertical alignment at the upper pulley assembly 25, it is normally necessary to further redirect the hose 22 into a selected horizontal conduit 18. The hose guide tackle 10 has a lower pulley assembly, generally indicated by the numeral 55, which guides and supports the hose 22 at the juncture of conduit 18 and manhole shaft 12. Referring now to FIGS. 4-7, inclusive, the lower pulley assembly 55 has a generally A-shaped frame, indicated by the numeral 56, which is preferably positioned angularly between the lower wall 19 of conduit 18 and the lower end 17 of manhole shaft 12. Referring particularly to FIGS. 4, 5, and 6, the frame 56 has parallel guide rails 57 which are joined at one end thereof by an end plate 58. Spanning the distance between guide rails 57 is a crosspiece or spacer dowel 59 which is attached thereto, as by fillet welds 60.

The guide rails 57 of frame 56 support a sliding pulley block, generally indicated by the numeral 65. The pulley block 65 has a pair of elongated rectangular sleeves 66 having inner plates 67 and outer plates 68 which enclose or encase the guide rails 57 on all four sides. Suspended between the inner plates 67 of pulley block 65 is a pin or gudgeon 69 which rotatably mounts a sheave 70. Constructed similar to sheave 27, the sheave 70 may have a somewhat cylindrical rim portion 71 provided with a medial indentation or groove 72 adapted to engage and seat the hose 22. After slidably positioning the pulley block 65 at the desired location, as for example the phantom line position 65', along guide rails 57, it is temporarily held by set screws 73 which are inserted in threaded nuts 74 fillet welded at 75 to the outer plates 68. Set screws 73 are preferably provided with hand manipulatable L-heads 76 which rotate the screws 73 through holes 77 in outer plates 68 into locking engagement with guide rails 57.

In addition to sliding pulley block 65, the entire frame 56 of lower pulley assembly 55 may be adjustably positioned to provide greater flexibility. Referring to FIGS. 1, 4, and 6, a pair of Z-shaped legs 80 project downwardly and outwardly from the lower extremities of guide rails 57 to which they are rigidly attached as by bolts 81. The legs 80 rigidly mount tubular collars 82 which are preferably substantially aligned with the frame 56. The collars 82 house cylindrical stakes 83 which may have pointed lower extremities 84 for more effective penetration and seating in the sediment which normally accumulates along the lower wall 19 of conduit 18. In order to vertically adjust the frame 56, the stakes 83 are slidably axially positioned in collars 82 and secured by T-headed set screws 85 which extend through an aperture 86 in housing 82 to contact the stakes 83. Set screws 85 may be hand rotated to engage the nuts 87 which are attached to legs 80, as by fillet welds 88, thereby achieving the locking function. Each of the stakes 83 may be independently adjusted to compensate for contour variations at the lower wall 19 of conduit 18.

Additional flexibility in the angular orientation of frame 56 is provided by a telescoping rod 90 which extends outwardly of end plate 58 to rest against the lower end 17 of manhole shaft 12. The rod 90 is housed in an elongated hollow cylindrical receiver 91 which is secured between spacer dowel 59 and end plate 58, as by fillet welds 92 and 93. The rod 90 is selectively axially extended through an aperture 94 in end plate 58 and held by a set screw 95 extending through receiver 91. The set screw 95 preferably has an L-head 96 for manual setting and rotationally matingly engages a nut 97 affixed to the receiver 91, as by fillet welds 98.

In operation, the nozzle 21 and hose 22 are introduced into a waste disposal network 11, or other conduit to be cleaned. The nozzle 21 and hose 22 are preferably manually payed out and inserted through the manhole shaft 12 and into the conduit 18. If the hose reel, or other assembly upon which the hose 22 is stowed, can be positioned directly over the manhole shaft 12, the upper pulley assembly 25 may be omitted. Frequently, the truck or carrier of the hose reel cannot gain suitable access and the hose 22 must be remotely payed out and supported by upper pulley assembly 25 to prevent damage to the hose 22 caused by the horizontal approach angle (as depicted in FIG. 1). The open V-shaped trough defined by guide bars 35, 36 leading to sheave 27 allows upper pulley assembly 25 to be positioned after the hose is inserted in the manhole 12.

The lower pulley assembly 55 is most conveniently placed before upper assembly 25 and after insertion of the hose 22. The placement may be accomplished manually by entering the manhole shaft 12 via footrests 20 or remotely from ground level 13 by ropes or other lowering devices. Suitable adjustments for height and angularity of frame 56 may be made according to the characteristics of each individual conduit, as previously described. Once the assemblies 25, 55 are positioned, seated and appropriately adjusted, fluid is introduced to hose 22 and the normal cleaning operation is carried out without damage to the hose 22.

A preferred form of the invention has been shown and described in sufficient detail to enable one skilled in the art to practice the invention. Since various modifications in details, materials and arrangements of parts are within the spirit of the invention herein disclosed and described, the scope of the invention should be limited solely by the scope of the attached claims.

What is claimed is:

In an apparatus for cleaning a conduit, said apparatus having a trailing hose, hose guide apparatus comprising, frame means positioned at an entrance to said conduit by adjustment means, said frame means having guide rails spaced and joined by a dowel, said adjustment means having legs attached at one end of said frame means, stakes adjustably attached to said legs to selectively position said frame means relative to said conduit, an adjustable projecting rod at the second end of said frame to further selectively position said frame means relative to said conduit, pulley block means having sleeves slidably engaging and selectively movable along said guide rails, and sheave means rotatably mounted in said pulley block means on a gudgeon and engaging said hose, whereby said hose is nonabrasively guided into said conduit.

References Cited

UNITED STATES PATENTS

| | | | |
|---|---|---|---|
| 1,185,206 | 5/1916 | Kuhlman | 15—104.3 |
| 1,274,931 | 8/1918 | Otterson | 15—104.3 X |
| 1,301,830 | 4/1919 | Fuchs | 15—104.3 |
| 1,558,984 | 10/1925 | Housman | 254—190 |
| 2,198,823 | 4/1940 | Kelpsh | 15—104.3 |
| 2,502,593 | 4/1950 | Robinson et al. | 15—104.3 |
| 2,808,852 | 10/1957 | Brant | 15—104.3 X |
| 3,065,760 | 11/1962 | Cailas | 254—190 X |

FOREIGN PATENTS

| | | |
|---|---|---|
| 798,448 | 3/1936 | France. |
| 1,081,831 | 5/1955 | France. |
| 892,206 | 3/1962 | Great Britain. |

CHARLES A. WILLMUTH, *Primary Examiner.*

E. L. ROBERTS, *Assistant Examiner.*